United States Patent
Oozu et al.

(10) Patent No.: US 8,765,311 B2
(45) Date of Patent: Jul. 1, 2014

(54) FUEL CELL

(75) Inventors: Hideyuki Oozu, Yokohama (JP); Yukinori Akamoto, Chiba-ken (JP); Yuuichi Sato, Tokyo (JP); Genta Oomichi, Yokohama (JP); Hirofumi Kan, Tokyo (JP); Daisuke Watanabe, Chigasaki (JP); Nobuyasu Negishi, Yokohama (JP); Yuichi Yoshida, Tsukuba (JP); Asako Sato, Yokohama (JP)

(73) Assignee: Murata Manufacturing Co., Ltd., Nagaokakyo-shi, Kyoto (JP)

( * ) Notice: Subject to any disclaimer, the term of this patent is extended or adjusted under 35 U.S.C. 154(b) by 904 days.

(21) Appl. No.: 12/528,599

(22) PCT Filed: Feb. 25, 2008

(86) PCT No.: PCT/JP2008/000327
§ 371 (c)(1),
(2), (4) Date: Dec. 8, 2009

(87) PCT Pub. No.: WO2008/117508
PCT Pub. Date: Oct. 2, 2008

(65) Prior Publication Data
US 2010/0086826 A1 Apr. 8, 2010

(30) Foreign Application Priority Data
Feb. 26, 2007 (JP) .................. P2007-045194
Jan. 16, 2008 (JP) .................. P2008-006449

(51) Int. Cl.
*H01M 8/06* (2006.01)
*H01M 8/10* (2006.01)
*H01M 8/04* (2006.01)

(52) U.S. Cl.
CPC ............... *H01M 8/04156* (2013.01); *H01M 8/0668* (2013.01)

USPC ........... 429/412; 429/410; 429/413; 429/414; 429/455; 429/457; 429/458; 429/462; 429/465; 429/483; 429/502; 429/513; 429/514; 429/515

(58) Field of Classification Search
None
See application file for complete search history.

(56) References Cited

U.S. PATENT DOCUMENTS 5,186,806 A * 2/1993 Clark et al. ............ 204/265
6,309,769 B1 * 10/2001 Haug ..................... 429/412

(Continued)

FOREIGN PATENT DOCUMENTS

EP  1 758 188 A1  2/2007
EP  1 808 921 A1  7/2007

(Continued)

OTHER PUBLICATIONS

International Preliminary Report on Patentability and Written Opinion issued by the International Bureau of WIPO in International Application No. PCT/JP2008/000327 on Sep. 1, 2009.

(Continued)

*Primary Examiner* — Jeffrey Wollschlager
(74) *Attorney, Agent, or Firm* — Finnegan, Henderson, Farabow, Garrett & Dunner, L.L.P.

(57) ABSTRACT

A fuel cell (1) includes an electromotive unit (2) having a membrane electrode assembly (MEA) (12), a fuel storage unit (4) storing a liquid fuel, and a fuel supply mechanism (3) supplying the fuel from the fuel storage unit (4) to a fuel electrode (7) of the membrane electrode assembly (12). The membrane electrode assembly (12) has a gas vent hole (17) provided in a manner to penetrate through at least an electrolyte membrane (11) to let a gas component generated on a side of the fuel electrode (7) escape to a side of an air electrode (10).

12 Claims, 10 Drawing Sheets

(56) References Cited

U.S. PATENT DOCUMENTS

| | | | |
|---|---|---|---|
| 6,632,553 B2 * | 10/2003 | Corey et al. | 429/414 |
| 6,981,877 B2 | 1/2006 | Ren et al. | |
| 2002/0102451 A1 * | 8/2002 | Acker et al. | 429/33 |
| 2003/0180594 A1 * | 9/2003 | Choi et al. | 429/32 |
| 2004/0209136 A1 * | 10/2004 | Ren et al. | 429/30 |
| 2005/0106429 A1 * | 5/2005 | Keefer | 429/20 |
| 2006/0068270 A1 * | 3/2006 | Ino et al. | 429/44 |
| 2007/0059575 A1 | 3/2007 | Kan et al. | |
| 2007/0243442 A1 | 10/2007 | Negishi et al. | |
| 2009/0061271 A1 * | 3/2009 | Sekino et al. | 429/26 |

FOREIGN PATENT DOCUMENTS

| | | | |
|---|---|---|---|
| JP | 2004-103262 | | 4/2004 |
| JP | 2005-518646 | | 6/2005 |
| JP | 2006-004793 | | 1/2006 |
| JP | 2006-085952 | | 3/2006 |
| JP | 2006-108028 | | 4/2006 |
| JP | 2006-318712 | | 11/2006 |
| KR | 10-2007-0011485 A | | 1/2007 |
| KR | 10-2007-0062543 A | | 6/2007 |
| WO | WO 2005/112172 A1 | | 11/2005 |
| WO | WO 2006/040961 A1 | | 4/2006 |
| WO | WO2006101132 | * | 9/2006 |
| WO | WO2006120958 | * | 11/2006 |

OTHER PUBLICATIONS

International Search Report from Japanese Patent Office mailed on Jun. 17, 2008, in international application No. PCT/JP2008/000327.

* cited by examiner

FUEL CELL

TECHNICAL FIELD

The present invention relates to a fuel cell using a liquid fuel.

BACKGROUND ART

In order to enable long-hour use of portable electronic devices such as laptop personal computers and cellular phones without charging, use of fuel cells as power sources and chargers of these portable electronic devices has been attempted. The fuel cell has a feature that it is capable of generating electricity only by being supplied with a fuel and air and is capable of continuously generating electricity for long hours by being replenished with the fuel. Therefore, the fuel cell can be the to be an extremely advantageous system as a power source and a charger of portable electronic devices if it can be made compact.

A direct methanol fuel cell (DMFC) is expected to be promising power source and charger of portable electronic devices because it can be made compact and its fuel can be handled easily. As a method of supplying a liquid fuel in the DMFC, there have been known an active method such as a gas supply type and a liquid supply type, and a passive method such as an internal vaporization type in which a liquid fuel in a fuel storage unit is vaporized inside the cell to be supplied to a fuel electrode.

The passive method such as the internal vaporization type is especially advantageous to miniaturization of the DMFC. There has been proposed a passive-type DMFC which is structured such that, for example, a membrane electrode assembly (MEA) having a fuel electrode, an electrolyte membrane, and an air electrode is disposed on a fuel storage unit composed of a box-shaped container (see, for example, patent reference 1). It has also been under consideration to connect an electromotive unit of the DMFC and the fuel storage unit via a flow path (see patent references 2 to 3).

When a methanol fuel with a high concentration or the like introduced from the fuel storage unit directly or via the flow path is vaporized and supplied to the fuel electrode, it is necessary to discharge gas components such as carbon gas, water vapor and the like generated due to cell reaction to the outside of the system while trapping the gasified fuel on the fuel electrode side of the MEA. In this regard, it has been considered in the DMFC of the conventional passive-type and the like to provide a gas vent hole in a side surface of the container on the fuel electrode side so as to release the gas components to the outside of the system.

However, when the gas vent hole is provided in the side surface of the container of the DMFC, the generated gas components escape from a peripheral portion of the MEA so that the gas components generated near the middle of the MEA cannot be sufficiently removed. This causes a problem of instability of electric generation characteristics of the DMFC. Further, the temperature is lower at the peripheral portion of the MEA than near the middle thereof and apt to cause clogging of the gas vent hole because of condensation of water vapor. This brings about a problem of failing to obtain stable output characteristics over time in the DMFC.

Patent Reference 1: WO 2005/112172 A1
Patent Reference 2: JP-A 2005-518646 (KOHYO)
Patent Reference 3: JP-A 2006-085952 (KOKAI)

DISCLOSURE OF THE INVENTION

An object of the present invention is to provide a fuel cell whose efficiency and stability over time of electric generation reaction by enhancing its capability to remove gas components generated on a fuel electrode side of an MEA accompanying the electric generation reaction.

A fuel cell according to an aspect of the present invention includes: an electromotive unit including a membrane electrode assembly having a fuel electrode, an air electrode, and an electrolyte membrane sandwiched between the fuel electrode and the air electrode; a fuel storage unit storing a liquid fuel; and a fuel supply mechanism supplying the fuel from the fuel storage unit to the fuel electrode, wherein the membrane electrode assembly has a gas vent hole provided in a manner to penetrate through at least the electrolyte membrane to let a gas component generated on a side of the fuel electrode escape to a side of the air electrode.

EXPLANATION OF NUMERALS

1 . . . fuel cell, 2 . . . electromotive unit, 3 . . . fuel supply mechanism, 4 . . . fuel storage unit, 5 . . . anode catalyst layer, 6 ... anode gas diffusion layer, 7 ... anode (fuel electrode), 8 ... cathode catalyst layer, 9 ... cathode gas diffusion layer, 10 ... cathode (air electrode), 11 ... electrolyte membrane, 12 ... MEA, 13 ... anode current collector, 14 ... cathode current collector, 16 ... unit cell, 17 ... gas vent hole, 18 ... fuel diffusion chamber, 19 ... container, 20 ... fuel diffusion material, 21 ... fuel supply unit, 22 ... moisture retention layer, 24 ... fuel injection part, 25 ... flow path, 26 ... pump, 27 ... through hole, 28 ... thin portion, 29 ... eyelet, 30 ... catalyst filter, 31 ... fuel injection port, 32 ... fuel discharge port, 33 ... thin tube, 34 ... fuel distribution plate

BEST MODE FOR CARRYING OUT THE INVENTION

Figure 1:
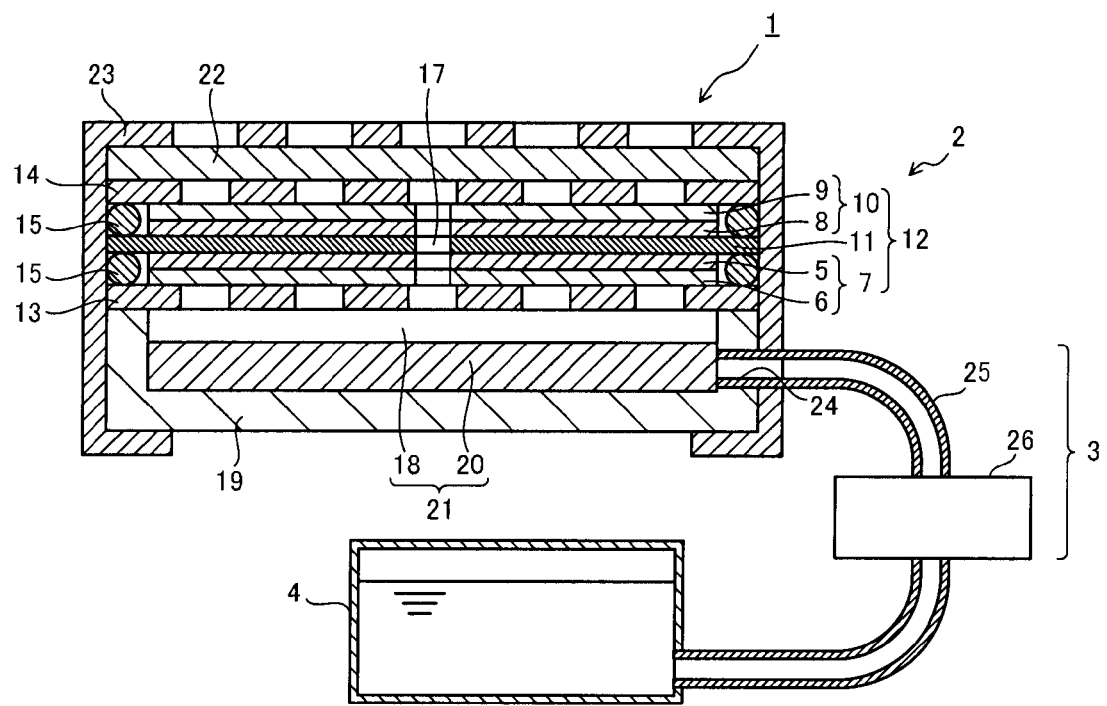
FIG. 1 is a view showing a structure of a fuel cell according to a first embodiment of the present invention.

Hereinafter, modes for carrying out the present invention will be described with reference to the drawings. FIG. 1 is a cross-sectional view showing a structure of a fuel cell according to a first embodiment of the present invention. A fuel cell 1 shown in FIG. 1 mainly includes an electromotive unit 2 including a membrane electrode assembly (MEA), a fuel supply mechanism 3 supplying a fuel to the electromotive unit 2, and a fuel storage unit 4 storing a liquid fuel.

The electromotive unit 2 has a membrane electrode assembly (MEA) 12 including an anode (fuel electrode) 7 having an anode catalyst layer 5 and an anode gas diffusion layer 6, a cathode (air electrode/oxidant electrode) 10 having a cathode catalyst layer 8 and a cathode gas diffusion layer 9, and a proton (hydrogen ion) conductive electrolyte membrane 11 sandwiched between the anode catalyst layer 5 and the cathode catalyst layer 8. Examples of catalysts contained in the anode catalyst layer 5 and the cathode catalyst layer 8 include simple substances of platinum-group elements such as Pt, Ru, Rh, Ir, Os, and Pd, alloys containing a platinum-group element, and the like.

For the anode catalyst layer 5, it is preferable to use a Pt alloy such as Pt—Ru, Pt—Mo, or the like having high resistance against methanol and carbon monoxide, and easily causing dehydrogenation reaction to draw hydrogen from methanol. For the cathode catalyst layer 8, it is preferable to use Pt, a Pt alloy such as Pt—Ni or the like, Pd, or a Pd alloy such as Pd—Pt or the like. The catalysts are not limited to these, and various kinds of substances having catalytic activity can be used. The catalysts may be supported catalysts using a conductive supporter such as a carbon material or may be non-supported catalysts.

The anode gas diffusion layer 6 stacked on the anode catalyst layer 5 not only serves to uniformly supply the fuel to the anode catalyst layer 5 but also has a current collecting function of the anode catalyst layer 5. The cathode gas diffusion layer 9 stacked on the cathode catalyst layer 8 not only serves to uniformly supply an oxidant to the cathode catalyst layer 8 but also has a current collecting function of the cathode catalyst layer 8. The anode gas diffusion layer 6 and the cathode gas diffusion layer 9 are made of a conductive porous material such as, for example, carbon paper.

Examples of a proton conductive material constituting the electrolyte membrane 11 include organic materials such as fluorine-based resin containing a perfluorosulfonic acid polymer having a sulfonic acid group (Nafion (product name, manufactured by Du Pont), Flemion (product name, manufactured by Asahi Glass Co., Ltd.)), hydrocarbon-based resin having a sulfonic acid group, and the like, and inorganic materials such as tungstic acid and phosphotungstic acid. The proton-conductive electrolyte membrane 11 is not limited to any of these.

The electromotive unit 2 is constituted by sandwiching the MEA 12 with an anode current collector 13 and a cathode current collector 14. The anode gas diffusion layers 6 are stacked on the anode current collector 13. The cathode gas diffusion layers 9 are stacked on the cathode current collector 14. As the current collectors 13 and 14, a mesh, a porous film made of a conductive metallic material such as, for example, Au is used. The current collectors 13 and 14 have through holes through which the fuel and the oxidant (air) flow. The electromotive unit 2 is sealed by sealing members 15 such as O-rings or the like. This prevents the leakage of the fuel and the leakage of the oxidant from the MEA 12.

The electromotive unit 2 has a plurality of unit cells (unit electric cells) 16 each composed of the anode (fuel electrode) 7 and the cathode (air electrode) 10 which are arranged with the electrolyte membrane 11 intervening therebetween. The plural unit cells 16, 16 ... are separately arranged within the plane of the electrolyte membrane 11 and electrically connected with each other by the current collectors 13 and 14. The plural unit cells 16 are connected in series. The MEA 12 has gas a vent hole 17 provided in a manner to penetrate through at least the electrolyte membrane 11. The gas vent hole 17 serves to let gas components generated on the side of the anodes 7 accompanying the electric generation reaction escape to the side of the cathodes 10.

The electromotive unit 2 is located on a container 19 forming a fuel diffusion chamber 18. The container 19 has a box-like form with its top portion open. The electromotive unit 2 is arranged such that the anodes 7 of the MEA 12 are located on the opening side of the container 19. In the container 19, a fuel diffusion material 20 is disposed. The fuel diffusion material 20 is made of a porous material in a plate form. As the fuel diffusion material 20, for example, a porous plate made of a resin such as polyethylene, polypropylene, polyurethane or the like is used. The fuel diffusion material 20 and the fuel diffusion chamber 18 constitute a fuel supply unit 21 which supplies a fuel while dispersing and diffusing the fuel in the plane direction of the anodes 7.

The electromotive unit 2 and a moisture retention layer 22 are stacked on the container 19 in which the fuel diffusion material 20 is disposed, and a cover plate 23 made of, for example, stainless steel covers the container 19 to hold the whole structure, thereby constituting an electric generation unit of the fuel cell (DMFC) 1 of the first embodiment. The moisture retention layer 22 is impregnated with part of water generated in the cathode catalyst layers 8 to inhibit the vaporization of the water and at the same time promote the uniform diffusion of the air to the cathode catalyst layers 8. The cover plate 23 has openings for introducing air thereinto. Between the moisture retention layer 22 and the cover plate 23, a surface layer is disposed when necessary. The surface layer adjusts an intake amount of the air, and has a plurality of air introduction ports whose number and size are adjusted according to the intake amount of the air.

The fuel diffusion material 20 is in contact with a fuel injection part 24 provided in the container 19. The fuel injection part 24 is connected to the fuel storage unit 4 via a flow path 25 for the liquid fuel like a pipe. In the fuel storage unit 4, a liquid fuel suitable for the MEA 12 is stored. Examples of the liquid fuel include methanol fuels such as methanol aqueous solutions with various concentrations and pure methanol. The liquid fuel is not limited to the methanol fuel. The liquid fuel may be, for example, an ethanol fuel such as an ethanol aqueous solution or pure ethanol, a propanol fuel such as a propanol aqueous solution or pure propanol, a glycol fuel such as a glycol aqueous solution or pure glycol, dimethyl-ether, formic acid, or another liquid fuel. A liquid fuel according to the MEA 12 is stored in the fuel storage unit 4.

Further, a pump 26 lies along the flow path 25. The pump 26 is not a circulation pump circulating the fuel but a fuel supply pump just delivering the liquid fuel from the fuel storage unit 4 to the fuel supply unit 21. The fuel supplied from the fuel supply unit 21 to the MEA 12 is used only for the electric generation reaction but is never circulated and returned to the fuel storage unit 4 afterwards. The fuel cell 1 of this embodiment is different from that of the conventional active method because the fuel is not circulated, and does not hinder the miniaturization and the like of a device. Further, because the pump 26 is used for supply of the liquid fuel, the fuel cell 1 of this embodiment is different also from that of the pure passive method such as the conventional internal vaporization type. The fuel cell 1 shown in FIG. 1 is one employing the method called, for example, the semi-passive type.

The kind of the pump 26 is not specifically limited, but it is preferable to use a rotary vane pump, an electroosmosis flow pump, a diaphragm pump, a squeeze pump, or the like, in view of that they can deliver a small amount of liquid fuel with high controllability and can be reduced in size and weight. The rotary vane pump delivers a liquid by rotating its vanes by a motor. The electroosmosis flow pump uses a sintered porous body such as silica causing an electroosmosis flow phenomenon. The diaphragm pump delivers a liquid by driving its diaphragm by an electromagnet or piezoelectric ceramics. The squeeze pump puts pressure on part of a flexible fuel flow path to squeeze and deliver the fuel. Among them, the use of the electroosmosis flow pump or the diaphragm pump having the piezoelectric ceramics is more preferable in view of driving power, size, and the like.

Since a main target of the fuel cell 1 is a small electronic device, the liquid delivery capability of the pump 26 is preferably within a range from 10 μL/minute to 1 mL/minute. When the liquid delivery capability is over 1 mL/minute, an amount of the liquid fuel delivered at a time becomes too large, and hence the non-operation period of the pump 26 in the total operation period becomes long. Accordingly, the supply amount of the fuel to the MEA 12 greatly fluctuates, resulting in great fluctuation in output. A reservoir may be provided between the pump 26 and the fuel supply unit 21 in order to prevent the fluctuation in output, but even the adoption of such a structure cannot fully reduce the fluctuation in the fuel supply amount, and will further leads to an increase in size and the like of the device.

When the liquid delivery capability of the pump 26 is below 10 μL/minute, the supply capability may possibly be insufficient at the time when a consumption of the fuel increases, such as the start-up time of the device. Consequently, activation characteristics and the like of the fuel cell 1 deteriorate. In light of these, it is preferable to use the pump 26 having a liquid delivery capability ranging from 10 μL/minute to 1 mL/minute. The liquid delivery capability of the pump 26 is more preferably within a range from 10 to 200 μL/minute. In order to realize such a liquid delivery amount stably, it is also preferable to use an electroosmosis flow pump or a diaphragm pump as the pump 26.

In the fuel cell 1 of this embodiment, the pump 26 is used to intermittently supply the liquid fuel from the fuel storage unit 4 to the fuel supply unit 21. The liquid fuel delivered by the pump 26 quickly spreads in the plane direction in the fuel diffusion material 20 and is uniformly supplied to the entire surface of anodes (fuel electrodes) 7 of the MEA 12 via the fuel diffusion chamber 18. In other words, the fuel is uniformly supplied in the plane directions of the anodes (fuel electrodes) 7 of the plural unit cells 16, 16 . . . , whereby the electric generation reaction is caused. The driving operation of the pump 26 for fuel supply (for liquid delivery) is preferably controlled based on the output of the fuel cell 1, temperature information, operation information of the electronic device being a power supply destination, and the like.

In order to enhance the stability and reliability of the fuel cell 1, a fuel shut-off valve may be disposed in series with the pump 26. As the fuel shut-off valve, used is an electrically driven valve which uses, as its actuator, an electromagnetic, a motor, a shape memory alloy, piezoelectric ceramics, a bimetal, or the like and whose opening/closing operation can be controlled by an electric signal. As the fuel shut-off valve, a latch-type valve having a state maintaining function is preferably used. A balance valve for balancing the pressure in the fuel storage unit 4 and the outside air may be mounted in the fuel storage unit 4 or the flow path 25.

In the case where the fuel is supplied from the fuel storage unit 4 to the MEA 12 by the fuel supply mechanism 3, the fuel cell 1 may be structured such that only the fuel shut-off valve is disposed in place of the pump 26. The fuel shut-off valve in this case is provided in order to control the supply of the liquid fuel via the flow path 25.

The fuel released from the fuel supply unit 21 is supplied to the anodes (fuel electrodes) 7 of the MEA 12 as described above. In the MEA 12, the fuel diffuses in the anode gas diffusion layers 6 to be supplied to the anode catalyst layers 5. When a methanol fuel is used as the liquid fuel, an internal reforming reaction of methanol expressed by the following expression (1) takes place in the anode catalyst layers 5. When pure methanol is used as the methanol fuel, water generated in the cathode catalyst layers 8 and water in the electrolyte membrane 11 react with methanol, so that the internal reforming reaction of the expression (1) takes place. Alternatively, the internal reforming reaction is caused by another reaction mechanism not requiring water.

$$CH_3OH+H_2O \rightarrow CO_2+6H^++6e^- \qquad (1)$$

Electrons (e⁻) generated by this reaction are led outside via the current collector 13, and they serve as what is called electricity to operate a portable electronic device or the like, and thereafter are led to the cathodes (air electrodes) 10 via the current collector 14. Further, protons (H⁺) generated by the internal reforming reaction of the expression (1) are led to the cathodes 10 via the electrolyte membrane 11. Air as the oxidant is supplied to the cathodes 10. In the cathode catalyst layers 8, the electrons (e⁻) and protons (H⁺) reaching the cathodes 10 react with oxygen in the air according to the following expression (2), and this reaction is accompanied by the generation of water.

$$6e^-+6H^++(3/2)O_2 \rightarrow 3H_2O \qquad (2)$$

In order to increase the power generated by the electric generation reaction of the fuel cell 1, both smooth catalysis reaction in the anode catalyst layers 5 and the cathode catalyst layers 8 and more effective contribution of the whole electrodes to the electric generation by uniformly supplying the fuel to the whole electrodes of the MEA 12 are important. To uniformly supply the fuel to the MEA 12 having the plural unit cells 16, 16 . . . , it is essential that (a) the supply amount itself of the pump 26 is controlled to be an appropriate amount, (b) the diffusion of the supplied fuel within the plane is uniform, (c) the gas components such as carbon gas, water vapor and the like generated by the electric generation reaction are quickly removed so that the supplied fuel uniformly reaches reaction portions, and so on.

Since the flow rate of the pump 26 is affected by the back pressure acting on the pump inlet, the flow rate of the pump 26 decreases as the internal pressure in the fuel diffusion chamber 18 connected to the pump 26 via the flow path 25 increases. Since the gas components such as the carbon gas, water vapor and the like are generated on the side of the anodes (fuel electrodes) 7 of the MEA 12, the gas components generated by the electric generation reaction cause an increase in the inner pressure of the fuel diffusion chamber 18. Further, the gas components themselves are a cause of hindering the supplied fuel from reaching the reaction portions. In other words, to increase the uniform supply and the supply amount of the fuel to the MEA 12, it is necessary to quickly discharge the gas components generated on the side of the fuel electrodes 7 by the electric generation reaction to the outside of the system.

Figure 2:
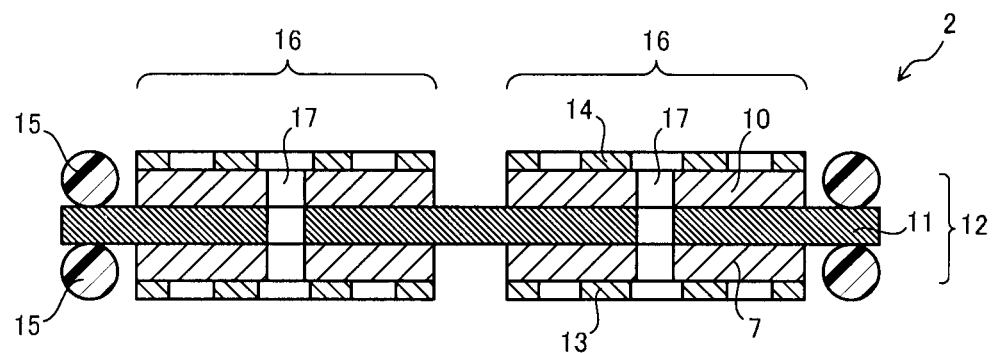
FIG. 2 is a cross-sectional view showing an electromotive unit of the fuel cell shown in FIG. 1.
Figure 3:
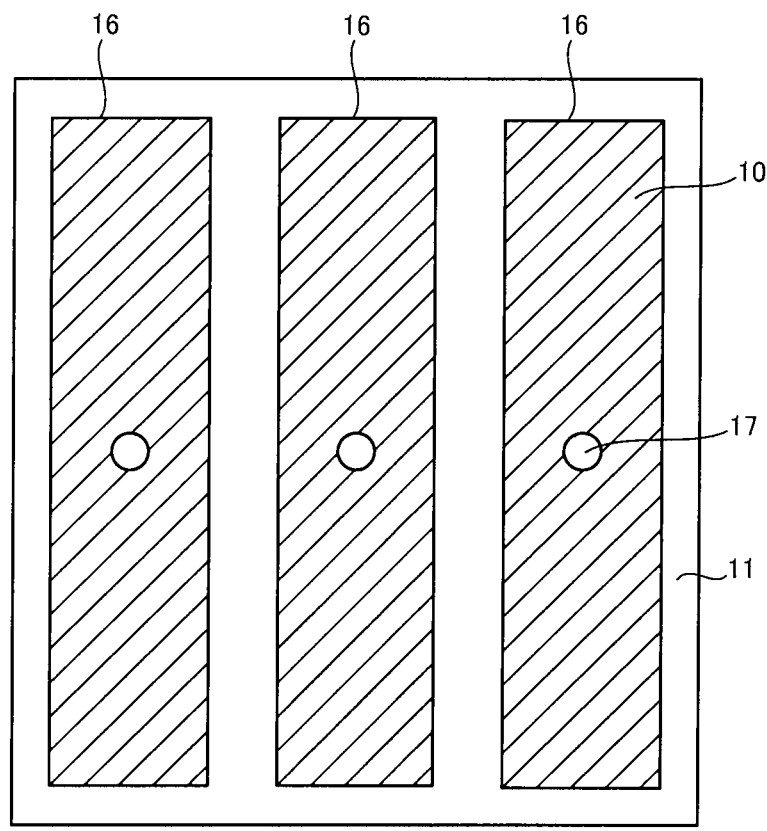
FIG. 3 is a plan view of the electromotive unit shown in FIG. 2.

The gas vent hole 17 is provided in the MEA 12 in the fuel cell 1 of the first embodiment. The gas vent holes 17, as shown in FIG. 2 and FIG. 3, are provided at portions of the unit cells 16, 16 . . . of the MEA 12, respectively. The plural gas vent holes 17 are provided in a manner to penetrate through the fuel electrodes 7, the electrolyte membrane 11, and the air electrodes 10 of the unit cells 16. The gas components generated on the side of the fuel electrodes 7 are allowed to escape to the side of the air electrodes 10 via the plural gas vent holes 17, and then released to the outside of the system. An arbitrary number of gas vent holes 17 are provided at arbitrary positions in the unit cell 16, so that the gas components can be uniformly removed from the plane of the MEA 12.

By removing the gas components (reaction products) generated at portions of the MEA 12 uniformly with respect to the plane of the MEA 12, the supplied fuel is allowed to uniformly reach the whole MEA 12. Further, the internal pressure in the fuel diffusion chamber 18 decreases concurrently with the removal of the gas components to decrease the back pressure acting on the pump inlet, whereby a sufficient flow rate of the liquid fuel by the pump 26 can be maintained. Since the gas vent holes 17 are provided in the unit cells 16, the clogging of the gas vent holes 17 due to condensation of the water vapor can be suppressed. Thus, the fuel is stably, uniformly and sufficiently supplied to the unit cells 16, 16 . . . of the MEA 12, thereby enabling an efficient and continuous electric generation reaction to take place in the whole MEA 12.

The pore diameter of the gas vent hole 17 is preferably not less than 50 μm and not greater than 2 mm. When the pore diameter is 50 μm or less, clogging due to condensation of water vapor and so on are apt to occur, which makes it difficult to achieve a sufficient gas venting effect. When the pore diameter of the gas vent hole 17 is 2 mm or greater, the fuel amount directly permeating to the side of the air electrodes 10 increases, and local heating state is apt to occur. This may deteriorate the stability of the output. The number of gas vent holes 17 can be arbitrarily set in consideration of the area of the MEA 12 and the gas generation amount.

Figure 4:
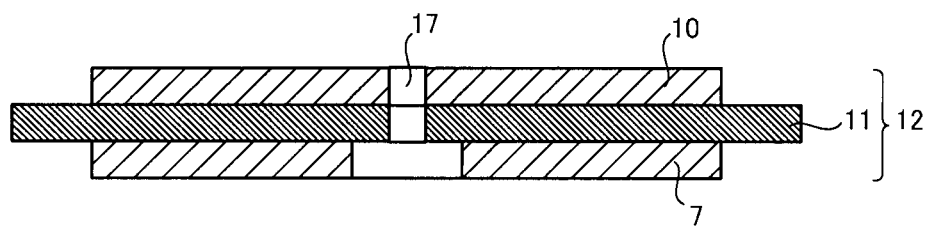
FIG. 4 is a cross-sectional view showing a structure example of a gas vent hole in the electromotive unit shown in FIG. 2.

When the gas vent holes 17 are opened at the electrode portions of the MEA 12, through holes each having a pore diameter equal to or larger than those in the electrolyte membrane 11 may be provided in the fuel electrodes 7 and the air electrodes 10. For example, as shown in FIG. 4, a through hole having a pore diameter larger than that in the electrolyte membrane 11 and that in the air electrode 10 is provided in the fuel electrode 7. This can prevent short circuit between the fuel electrode 7 and the air electrode 10 through the electrolyte membrane 11. The through hole having a larger pore diameter may be provided in the fuel electrode 7.

Figure 5:
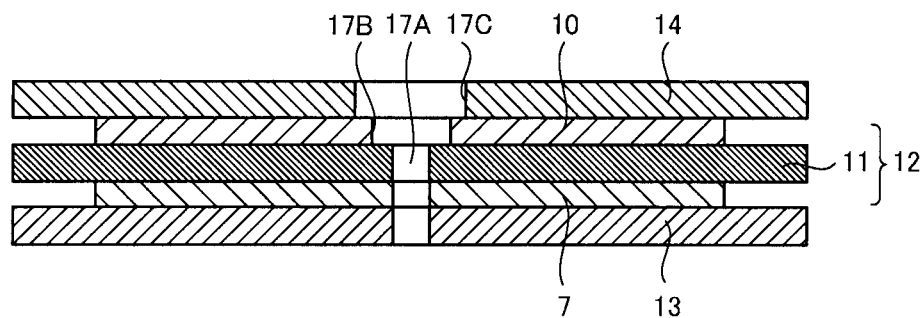
FIG. 5 is a cross-sectional view showing another structure example of the gas vent hole in the electromotive unit shown in FIG. 2.

When the through hole having a larger pore diameter is provided on the fuel electrode 7 side, it is preferable, as shown in FIG. 5, to make the diameter of a through hole 17B in the air electrode 10 equal to or larger than the diameter of a through hole 17A in the electrolyte membrane 11, and make the diameter of a through hole 17C in the electricity collector 14 equal to or larger than the diameter of the through hole 17B in the air electrode 10. It is more preferable to set the pore diameters such that the through holes 17 in the electrolyte membrane 11, the air electrode 10, and the electricity collector 14 are in ascending order of size. By setting the pore diameters such that $D1 \leq D2 \leq D3$ where the pore diameter of the through hole 17A in the electrolyte membrane 11 is $D1$, the pore diameter of the through hole 17B in the air electrode 10 is $D2$, and the pore diameter of the through hole 17C in the electricity collector 14 is $D3$, the pressure loss in the gas vent holes 17 is reduced, thereby making it possible to quickly discharge the gas components.

Incidentally, the moisture retention layer 22 is stacked on the electricity collector 14. The moisture retention layer 22 is composed of a member having gas permeability, and therefore can discharge, even in the state as it is, the gas components passed through the gas vent hole 17, to the outside of the system. It is preferable, however, to form a through hole 27 at a position corresponding to the gas vent hole 17 in the moisture retention layer 22 in order to enhance the capability to release the gas components to the outside the system. In this case, it is preferable to set the pore diameters such that the through holes in the electrolyte membrane 11, the air electrode 10, the electricity collector 14, and the moisture retention layer 22 are in ascending order of size as in FIG. 5.

Figure 6:
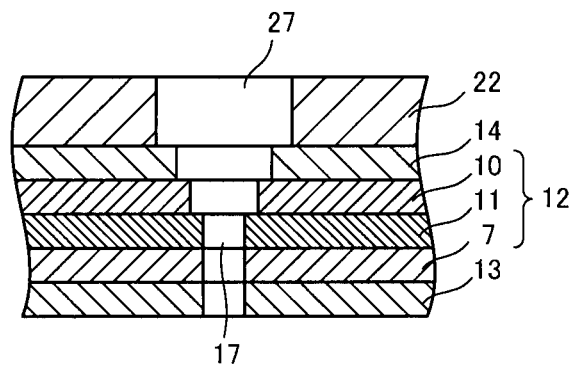
FIG. 6 is a cross-sectional view showing a structure example of a moisture retention layer on the gas vent hole shown in FIG. 2.
Figure 7:
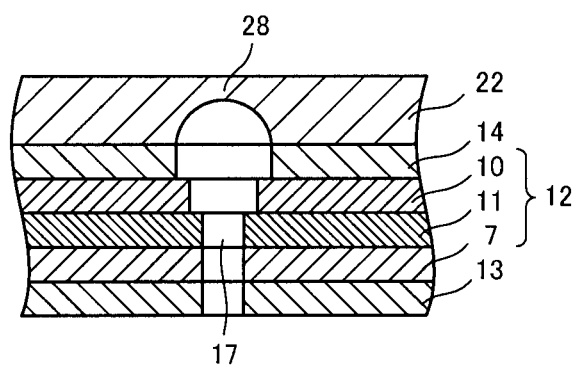
FIG. 7 is a cross-sectional view showing another structure example of the moisture retention layer on the gas vent hole shown in FIG. 2.

A gas vent portion provided in the moisture retention layer 22 (the through hole 27 in FIG. 6) may be a thin portion 28 as shown in FIG. 7. By decreasing the permeation resistance at a portion of the moisture retention layer 22 corresponding to the gas vent hole 17 as compared to other portions, the ability to release the gas components can be increased. Accordingly, the same effects as those by the through hole 27 and the thin portion 28 can also be achieved by disposing a portion having a low permeation degree at the portion of the moisture retention layer 22 corresponding to the gas vent hole 17.

Figure 8:
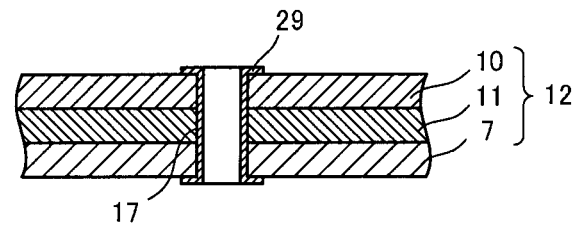
FIG. 8 is a cross-sectional view showing a state in which a pore diameter maintaining means is added to the gas vent hole shown in FIG. 2.

In the fuel cell 1 of this embodiment, the clogging of the gas vent hole 17 due to condensation of the water vapor is suppressed based on the formation position of the gas vent hole 17. However, the gas vent hole 17 may be clogged because the MEA 12 absorbs water to swell. Hence, such a structure may be employed that the inner wall surface of the gas vent hole 17 is secured to maintain its pore diameter. Examples of a pore diameter maintaining means for the gas vent hole 17 include an eyelet 29 as shown in FIG. 8. The shrinkage of the pore diameter can be suppressed also by sintering the periphery of the gas vent hole 17.

For example, when a needle-like article is used to form the gas vent hole 17 in the MEA 12, a heating mechanism is connected to the needle-like article, whereby the formation of the gas vent hole 17 and the sintering of its periphery can be concurrently implemented by the needle-like article. Instead of the sintering of the periphery of the gas vent hole 17, a periphery including the inner wall surface of the gas vent hole 17 may be hardened by a resin or the like. By applying such a pore diameter maintaining means (pore diameter maintaining part) to the gas vent hole 17, the clogging of the gas vent hole 17 due to the swelling of the MEA 12 can be prevented more surely. The pre diameter maintaining means is also applicable to a later-described case where the gas vent hole 17 is formed only in the electrolyte membrane 11.

In the fuel cell 1 of the first embodiment, the pump 26 is used to intermittently supply an amount of liquid fuel required for the cell reaction to the fuel electrodes 7 of the MEA 12 including the plural unit cells 16, 16 . . . planarly arranged and electrically connected. The delivered liquid fuel is uniformly diffused within a plane by the fuel diffusion material 20, so that stable output can be obtained. Since the liquid fuel to be delivered is a fuel with a high concentration and the liquid fuel is delivered little by little according to electric generation, the liquid delivery system of the liquid fuel can be reduced in space. In addition, the gas vent holes 17 communicating with the outside are provided in the MEA 12, whereby the gas components such as carbon gas, water vapor and the like generated by the reaction are allowed to escape to the outside the system so that the internal pressure on the side of the fuel electrodes 7 can be maintained at a low pressure state.

With the gas vent hole provided in a container side surface in the prior art, stable electric generation characteristics cannot be achieved because the generated gas escapes from the peripheral portion and therefore removal of the reaction product at a middle portion of the electrode is insufficient. Further, the temperature is lower at the peripheral portion than at the middle portion, which tends to cause clogging due to condensation of water vapor to fail to achieve stable output characteristics over time. In this regard, the gas vent holes 17 are provided in the MEA 12, thereby making it possible to quickly remove the generated gas components. Further, the gas vent holes 17 can be located at positions where the temperature is high and therefore hardly apt to clog due to condensation of water vapor, so that the stability of output can be enhanced.

Figure 9:
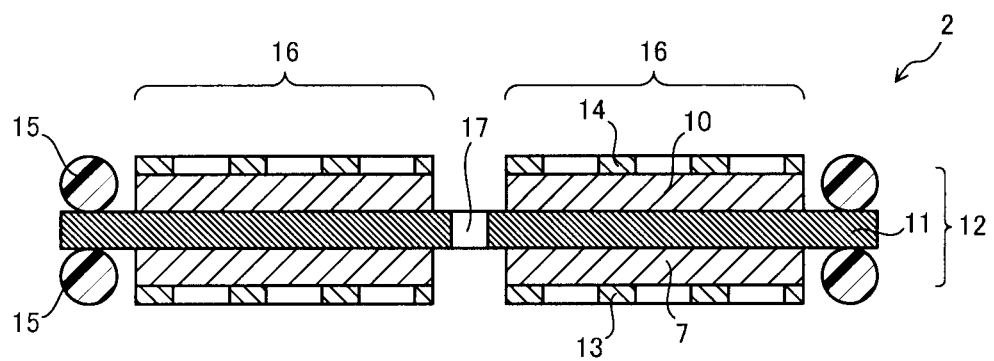
FIG. 9 is a cross-sectional view showing an electromotive unit of a fuel cell according to a second embodiment of the present invention.
Figure 10:
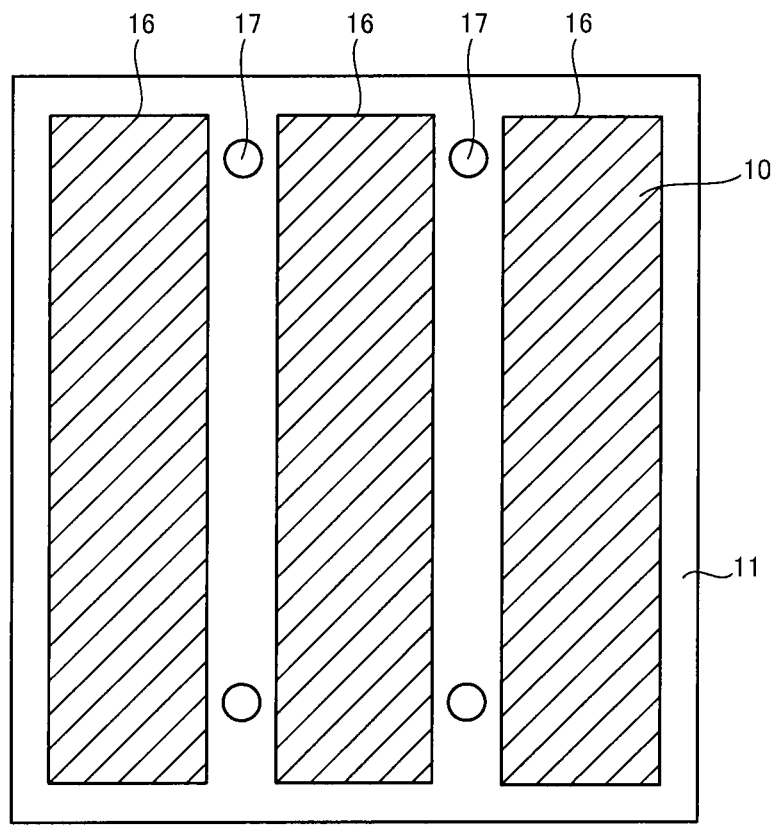
FIG. 10 is a view showing an example of a planar structure of the electromotive unit shown in FIG. 9.

Next, a fuel cell according to a second embodiment of the present invention will be described with reference to FIG. 9 and FIG. 10. FIG. 9 and FIG. 10 show an electromotive unit 2 of the fuel cell according to the second embodiment. Though the fuel supply unit, the flow path, the fuel supply pump, the fuel storage unit and so on are omitted in FIG. 9 and FIG. 10, the fuel cell of the second embodiment includes those components whose concrete structures are the same as those of the fuel cell 1 of the above-described first embodiment.

Figure 11:
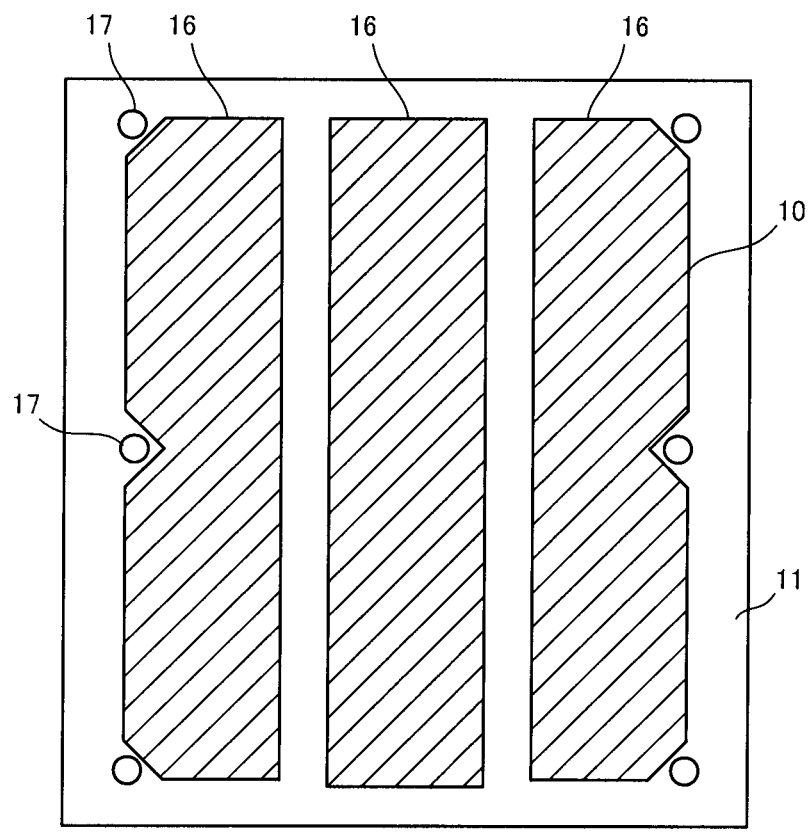
FIG. 11 is a view showing another example of the planar structure of the electromotive unit shown in FIG. 9.

In the fuel cell of the second embodiment, the gas vent holes 17 are provided at portions corresponding to spaces between the unit cells 16, 16 . . . of the MEA 12, more specifically, portions where only the electrolyte membrane 11 exists. The gas vent holes 17 may be provided at portions corresponding to spaces between the unit cells 16, 16 . . . , which also make it possible to quickly remove the generated gas components. Since the gas vent holes 17 are located near the middle of the MEA 12 where the temperature is high, the clogging due to condensation of water vapor is prevented and the stability of output can be enhanced. Depending on the temperature distribution within the MEA 12, the gas vent holes 17 may be formed at portions of the electrolyte membrane 11 corresponding to the periphery of the unit cells 16 as shown in FIG. 11. The gas vent holes 17 shown in FIG. 10 and the gas vent holes 17 shown in FIG. 11 may be combined.

When the gas vent holes 17 are provided at the portions corresponding to the spaces between the unit cells 16, 16 . . . of the MEA 12, the gas vent holes 17 possibly discharge the fuel to the outside of the system together with the gas components such as carbon gas and the like. Hence, a catalyst filter can be provided around the gas vent holes 17 and on the top portion (on the side of the air electrodes 10). This can promote oxidation reaction of the fuel flowing together with the gas components and suppress the fuel flowing out of the system. As the catalyst filter, a catalyst which is similar to the catalyst layer and molded in porous form can be used. The catalyst filter preferably has gas permeability so as not to inhibit the gas venting ability. Note that the catalyst filter may be applied in the first embodiment.

Figure 12:
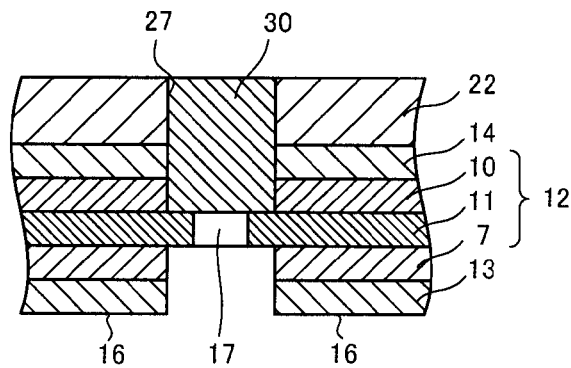
FIG. 12 is a cross-sectional view showing a structure example of a state in which a catalyst filter is added to the gas vent hole shown in FIG. 9.
Figure 13:
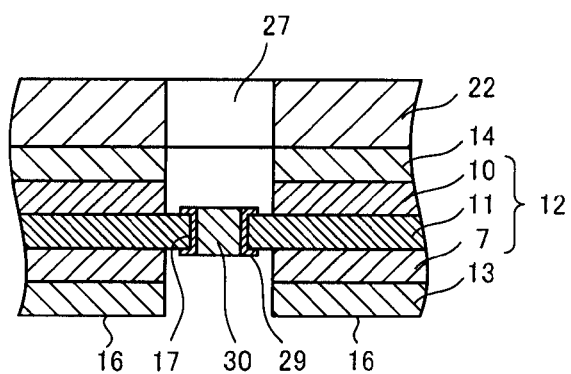
FIG. 13 is a cross-sectional view showing another structure example of the state in which the catalyst filter is added to the gas vent hole shown in FIG. 9.
Figure 14:
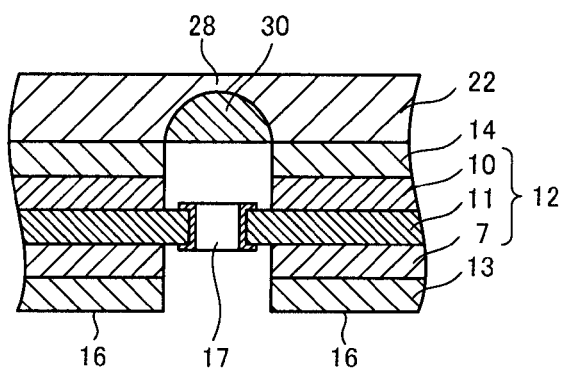
FIG. 14 is a cross-sectional view showing still another structure example of the state in which the catalyst filter is added to the gas vent hole shown in FIG. 9.

FIG. 12 shows a structure in which a catalyst filter 30 in a circular form is disposed on the top of the gas vent hole 17. In this case, a circular through hole 27 is formed in the moisture retention layer 22, and the catalyst filter 30 is disposed in the through hole 27. This makes it possible to stabilize the position where the catalyst filter 30 is disposed. FIG. 13 shows a structure in which an eyelet 29 is provided in the gas vent hole 17 in the electrolyte membrane 11, and the catalyst filter 30 is disposed in the eyelet 29. The catalyst filter 30 may be disposed in a hole for providing the thin portion 28 in the moisture retention layer 22 as shown in FIG. 14. As described above, the catalyst filter 30 can be disposed in various forms near the gas vent hole 17.

Figure 15:
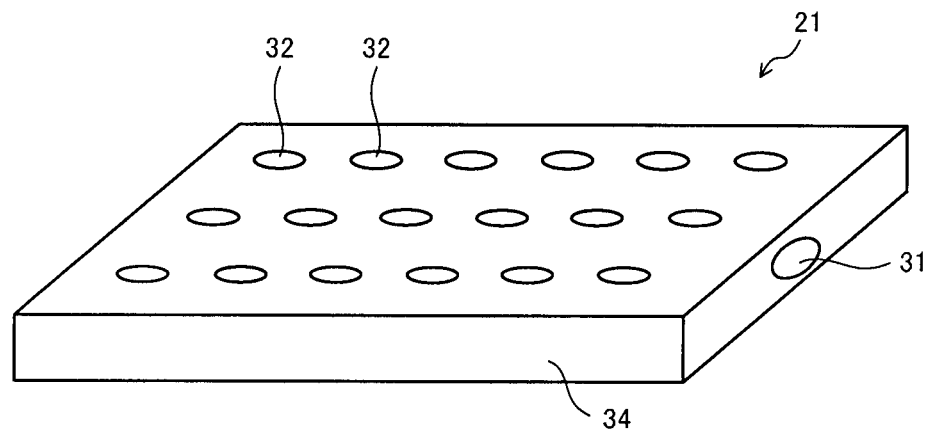
FIG. 15 is a perspective view showing another example of a fuel supply unit used in the fuel cell of the present invention.
Figure 16:
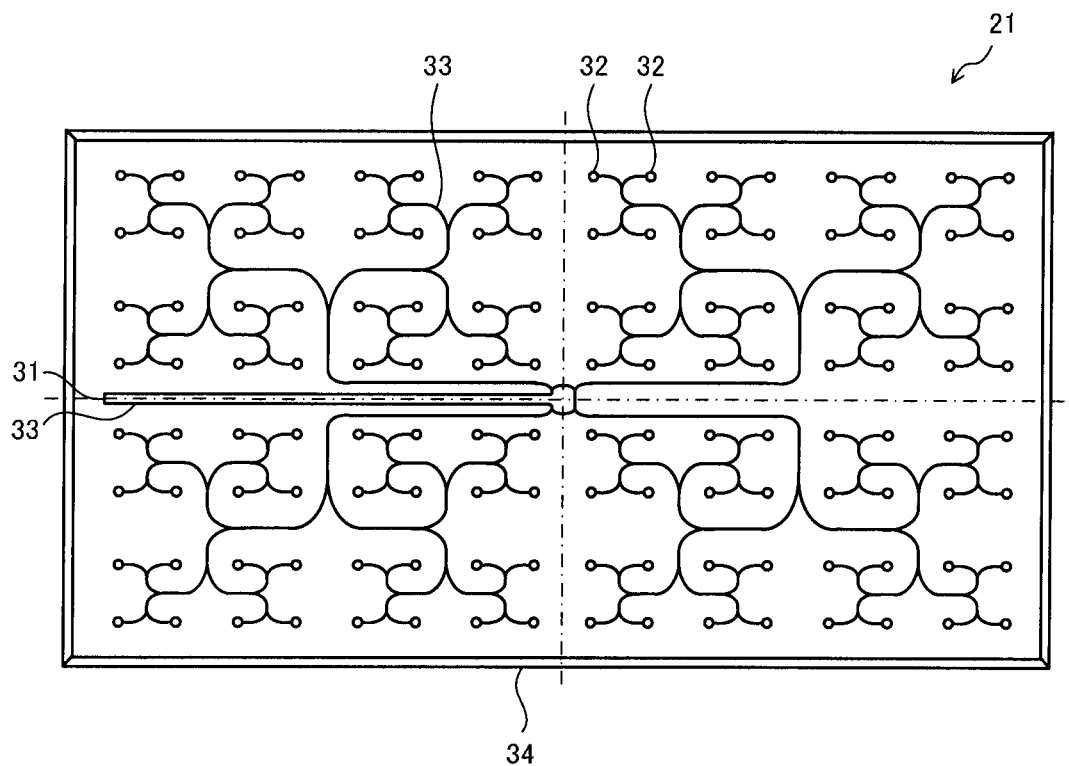
FIG. 16 is a plan view of the fuel supply unit shown in FIG. 15.

Though the fuel diffusion material 20 disposed in the fuel diffusion chamber 18 is employed as the fuel supply unit 21 supplying the fuel while dispersing the fuel in the plane direction in the above-described embodiments, the structure of the fuel supply unit is not limited to this structure. The fuel supply unit 21 can also be structured by a fuel distribution plate 34 in which a fuel injection port 31 and a plurality of fuel discharge ports 32 are connected by a fuel passage such as a thin tube 33 as shown in FIG. 15 and FIG. 16. In place of the thin tube 33 formed in the fuel distribution plate 34, the fuel passage may be composed of a fuel flowing groove. In this case, the fuel supply unit 21 is structured by covering a flow path plate having the fuel flowing groove by a diffusion plate having a plurality of fuel discharge ports.

The fuel supply unit 21 shown in FIG. 15 and FIG. 16 includes the fuel distribution plate 34 having at least one fuel injection port 31 into which the liquid fuel flows and the plural fuel discharge ports 32 from which the liquid fuel or its vaporized components are discharged. Inside the fuel distribution plate 34, the thin tube 33 functioning as a passage of the liquid fuel is formed. At one end (starting end portion) of the thin tube 33, the fuel injection port 31 is provided. The thin tube 33 branches off in the middle into a plurality of thin tubes, and at end portions of the respective branched thin tubes 33, the fuel discharge ports 32 are provided respectively. The thin tube 33 is preferably a through hole with a 0.05 to 5 mm inside diameter, for instance.

The liquid fuel introduced into the fuel distribution plate 34 from the fuel injection port 31 is led to the plural fuel discharge ports 32 via the plural branched thin tubes 33. The use of the fuel supply unit 21 with such a structure makes it possible to equally distribute the liquid fuel which is injected from the fuel injection port 31 into the fuel distribution plate 34, to the plural fuel discharge ports 32 irrespective of the direction and the position. Therefore, it is possible to further enhance the uniformity of the electric generation reaction within the plane of the MEA. Further, the fuel injection port 31 and the plural fuel discharge ports 32 are connected by the thin tube 33 to allow such a design that a larger amount of fuel is supplied to a specific place of the fuel cell.

This contributes to improvement in uniformity of the electric generation degree and so on of the MEA.

The fuel released from the fuel discharge ports 32 generates water and carbon gas through the electric generation reaction at the fuel electrodes 7. The carbon gas and the like generated by the electric generation reaction are discharged to the outside of the system via the gas vent holes 17. Therefore, if the gas vent holes 17 are formed near the fuel discharge ports 32, unreacted fuel may also be discharged from the gas vent holes 17 to the side of the air electrodes 10 and even to the outside of the system. Hence, it is preferable to form the gas vent holes 17 at positions where they do not substantially overlap with the fuel discharge ports 32 in plan view. This makes it possible to improve the use efficiency of the fuel to enhance the electric generation reaction and prevent the unreacted fuel from flowing out to the air electrodes 10 and the outside of the system. When a plurality of fuel discharge ports 32 exist, the gas vent hole 17 is preferably formed at a position corresponding to substantially the middle on a line linking two fuel discharge ports 32 adjacent to each other in plan view.

The fuel cells of the above-described embodiments exhibit the effects when using various kinds of liquid fuels, and the kind and concentration of the liquid fuel are not limited. However, the fuel supply unit 21 supplying the fuel while dispersing the fuel in the plane direction is effective especially when the fuel concentration is high. Therefore, the fuel cells 1 of the embodiments successfully exhibit the performance and effects when methanol with a concentration of 80% or higher is used as the liquid fuel. Therefore, the embodiments are preferably applied to a fuel cell using, as the liquid fuel, a methanol aqueous solution having a methanol concentration of 80% or higher or pure methanol.

Further, though the case in which the present invention is applied to the semi-passive type fuel cell is described in the embodiments, the present invention is not limited to the semi-passive type fuel cell. The gas vent holes provided in the MEA are also applicable to fuel cells of a pure passive type. Thus, the present invention is applicable to fuel cells of a passive type, a semi-passive type and the like. The effects accompanying the removal of gas components generated by the electric generation reaction can be effectively achieved in these cases.

In the fuels cells 1 of the above-described embodiments, the fuel itself such as methanol or the like may flow out to the side of the cathodes (air electrodes) 10 in addition to the gas components such as carbon gas, water vapor and the like generated on the side of the anodes (fuel electrodes) 7 because the gas vent holes 17 are provided in the MEA 12. If a so-called crossover that the fuel such as methanol or the like flows out to the side of the cathodes (air electrodes) 10 takes place, unreacted fuel such as methanol or the like causes oxidation reaction on the side of the cathodes 10 to decrease the catalytic activity of the cathode catalyst layers 8 and inhibit the electric generation reaction by the above-described expression (2). These would be a cause of drop of an output voltage of the fuel cell 1.

In this regard, it is effective to set the catalyst amount per unit area of the cathode catalyst layer 8 to 1 mg/cm$^2$ or more. By setting the catalyst amount in the cathode catalyst layer 8 to 1 mg/cm$^2$ or more, a sufficient catalyst amount enough for the electric generation reaction to proceed can be ensured even if the unreacted methanol causes oxidation reaction on the cathode 10 side. This makes it possible to maintain the output voltage of the fuel cell 1 having the gas vent holes 17 provided in the MEA 12.

Further, the cathode catalyst layer 8 preferably contains, as a catalyst, Pd or a Pd alloy having a low oxidation reactivity (oxidation activity) of methanol or the like. The cathode catalyst layer 8 containing Pd or a Pd alloy as a catalyst suppresses the oxidation reaction of the unreacted methanol on the cathode 10 side. Therefore, it is possible to prevent a decrease in catalyst activity and a decrease in the electric generation reaction on the cathode 10 side due to the oxidation reaction of methanol. Thus, the output voltage of the fuel cell 1 having the gas vent holes 17 provided in the MEA 12 can be maintained in a good condition.

Examples of the Pd alloy used in the cathode catalyst layer 8 include alloys each of which contains at least one kind selected from Pt, Ir, Co and Ni and the balance Pd. It is preferable to use a Pd—Pt alloy among others. It is particularly effective to use such a cathode catalyst layer 8 containing a Pd alloy or a simple substance of Pd in combination with the above-described catalyst amount of 1 mg/cm$^2$ or more. Thus, the output voltage of the fuel cell 1 having the gas vent holes 17 provided in the MEA 12 can be maintained in a good condition.

Next, concrete examples of the fuel cell of the present invention and evaluation results thereof will be described. Since the object of the present invention is to provide a simplified and miniaturized fuel cell, the fuel cell is compared to a fuel cell of a liquid supply type which can be made compact, exclusive of a fuel cell of a conventional diluted fuel circulation type which has an extremely complicated system and is difficult to be made compact as described above.

EXAMPLE 1

The fuel cell whose planar structure of the electromotive unit (MEA) is shown in FIG. 3 was fabricated as follows. First, a Pt—Ru-based catalyst layer (10 mm×60 mm) was applied on carbon paper in which a hole having an opening diameter of 1 mm was formed at its central portion in advance, thereby forming a fuel electrode. Then, a Pt black catalyst layer (10 mm×60 mm) was applied on the carbon paper, thereby forming an air electrode. Three sets of unit cells each composed of the fuel electrode and the air electrode were formed to hold an electrolyte membrane made of a perfluoro surfonic acid film such that the catalyst layer of each of the unit cells was in contact with the electrolyte membrane. They were joined by five-minute hot pressing under the condition of 120° C. and a 100 kg/cm$^2$ pressure, thereby forming an MEA. Further, through holes each having an opening diameter of 0.2 mm were formed as the gas vent holes at the middle portions of the cells as shown in FIG. 3.

The above-described MEA was sandwiched between electric collectors to form an electromotive unit, and the electromotive unit and a fuel diffusion material were assembled into a container to fabricate an electric generation unit having an electric generation area of 18 cm$^2$. As the fuel diffusion material, a porous plate made of polyethylene having an average pore diameter of 10 μm and a porosity of 30% was used. Then, the electric generation unit and a fuel storage unit were connected via a fuel supply pump to fabricate a liquid fuel cell of the example 1. Methanol was intermittently supplied as the liquid fuel to this fuel cell by the pump to cause electric generation. As oxidant gas, spontaneously taken air was used.

EXAMPLE 2

The fuel cell whose planar structure of the electromotive unit (MEA) is shown in FIG. 10 was fabricated as follows. First, a Pt—Ru-based catalyst layer (10 mm×60 mm) was applied on carbon paper, thereby forming a fuel electrode. Then, a Pt black catalyst layer (10 mm×60 mm) was applied on the carbon paper, thereby forming an air electrode. Three sets of unit cells each composed of the fuel electrode and the air electrode were formed to hold an electrolyte membrane made of a perfluoro surfonic acid film such that the catalyst layer of each of the unit cells was in contact with the electrolyte membrane. They were joined by five-minute hot pressing under the condition of 120° C. and a 100 kg/cm$^2$ pressure, thereby forming an MEA. Through holes each having an opening diameter of 1 mm were formed as the gas vent holes in the arrangement shown in FIG. 10.

The above-described MEA was sandwiched between electric collectors to form an electromotive unit, and the electromotive unit and a fuel diffusion material were assembled into a container to fabricate an electric generation unit having an electric generation area of 18 cm$^2$. As the fuel diffusion material, a porous plate made of polyethylene having an average pore diameter of 10 μm and a porosity of 30% was used. Then, the electric generation unit and a fuel storage unit were connected via a fuel supply pump to fabricate a liquid fuel cell of the example 2. Methanol was intermittently supplied as the liquid fuel to this fuel cell by the pump to cause electric generation. As oxidant gas, spontaneously taken air was used.

COMPARATIVE EXAMPLE 1

An electromotive unit was fabricated as in the example 1 except that the through holes (gas vent holes) were not formed in the electromotive unit. The electromotive unit was installed in a contained having a hole of 0.1 mm formed in a side surface of a fuel chamber to fabricate an electric generation unit having an electric generation area of 18 cm$^2$. The electric generation unit and a fuel storage unit were connected via a fuel supply pump to fabricate a liquid fuel cell of the comparative example 1. Methanol was intermittently supplied as the liquid fuel to this fuel cell by the pump to cause electric generation. As oxidant gas, spontaneously taken air was used.

Figure 17:
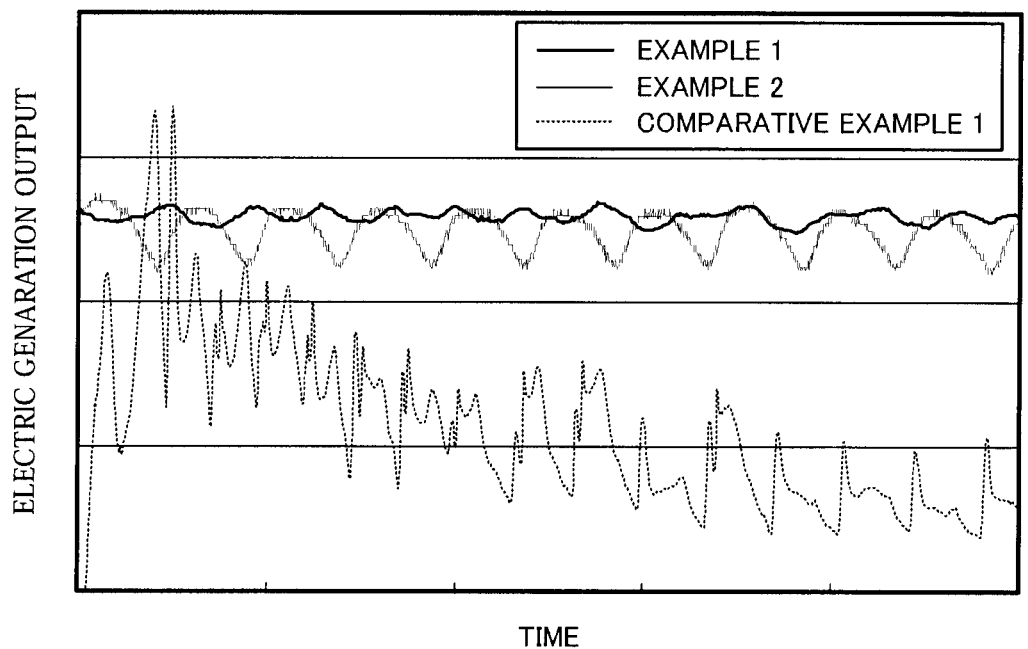
FIG. 17 is a graph showing time-output characteristics of the fuel cells according to examples 1 and 2.

Time-output characteristics of the fuel cells according to the examples 1 to 2 and the comparative example 1 are shown in FIG. 17. As is apparent from FIG. 17, in both of the fuel cells of the example 1 and the example 2, the output characteristics which are stable over time with periodic fluctuation in the output by the intermittent fuel injection are obtained. In contrast, in the comparative example 1, it is found that the output level is low because of uneven diffusion of the fuel to the cells, and the output density decreases over time due to the clogging of the gas vent holes.

EXAMPLE 3

Fuel cells were fabricated as in the example 1 and the example 2 except that each of the Pt amounts of the cathode catalyst layers (catalyst amounts) in the example 1 and the example 2 was varied to 0.5 mg/cm$^2$, 1 mg/cm$^2$, 1.8 mg/cm$^2$, and 2.2 mg/cm$^2$. The output voltages of the fuel cells were compared to the output voltages of fuel cells fabricated in the same manner except that the gas vent holes were not formed in MEAs, and the output losses (%) due to the formation of the vent holes were measured and evaluated. The results of them are shown in FIG. 18.

Figure 18:
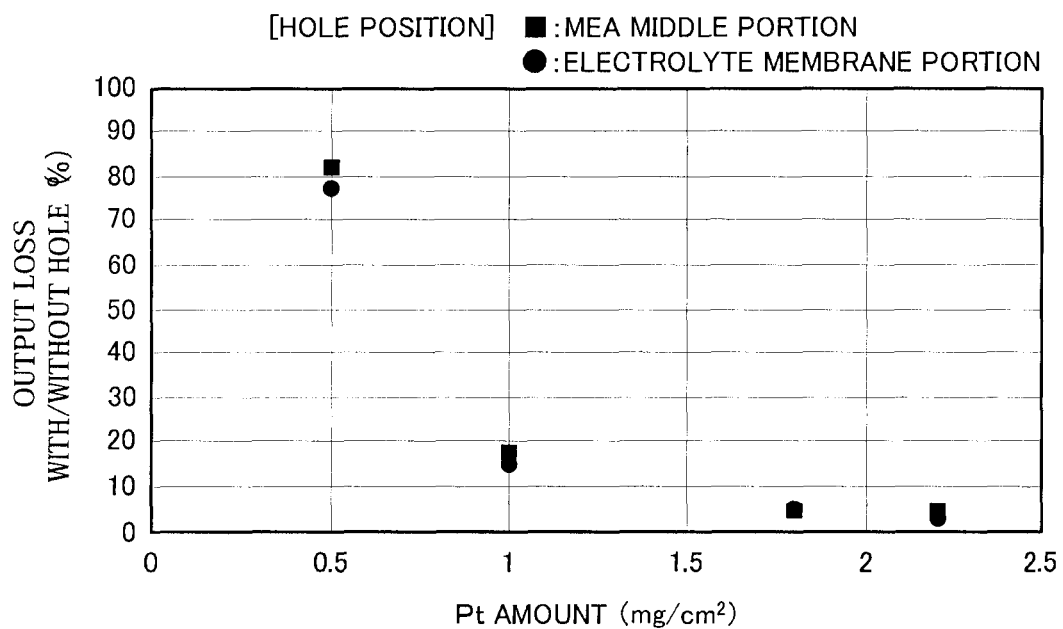
FIG. 18 is a graph showing a relation between the catalyst amount and the output loss of the fuel cell according to an example 3.

As is apparent from FIG. 18, the fuel cell having a catalyst amount in the cathode of 0.5 mg/cm$^2$ has a large output loss due to the formation of the gas vent holes, while each of the fuel cells having a catalyst amount in the cathode of 1.0 mg/cm$^2$ or more has a small output loss. As described above, by setting the catalyst amount in the cathode to 1 mg/cm$^2$ or more, the output voltage of the fuel cell can be maintained even when the gas vent holes are provided in the MEA.

Figure 19:
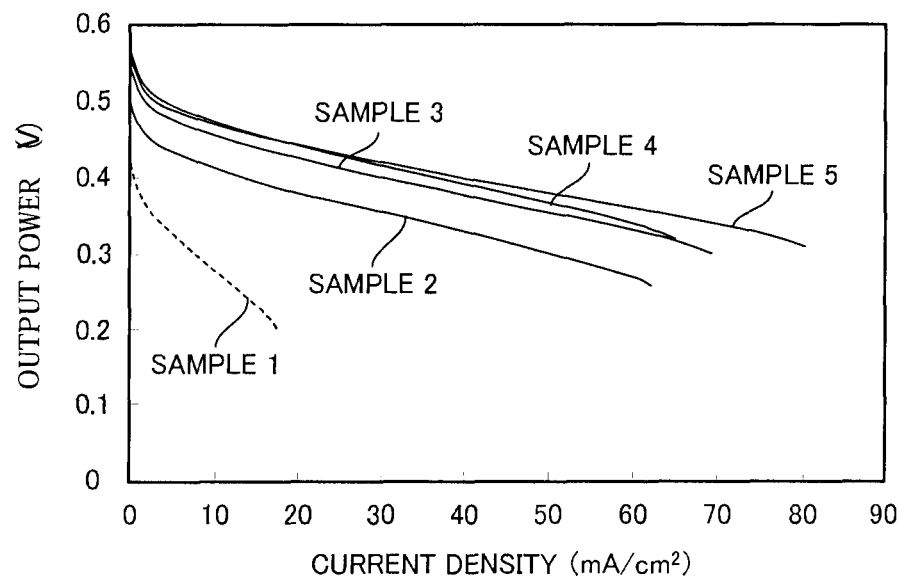
FIG. 19 is a graph showing load current characteristics of the output voltage of the fuel cell according to the example 3.

Load current characteristics of the above-described fuel cells were measured. The results of them are shown in FIG. 19. In FIG. 19, a sample 1 is a fuel cell having a Pt amount (catalyst amount) of 0.5 mg/cm$^2$, a sample 2 is a fuel cell having a Pt amount (catalyst amount) of 1.0 mg/cm$^2$, a sample 3 is a fuel cell having a Pt amount (catalyst amount) of 1.8 mg/cm$^2$, and a sample 4 is a fuel cell having a Pt amount (catalyst amount) of 2.2 mg/cm$^2$. A sample 5 is a fuel cell using, in place of Pt, a Pd-50 at. % Pt alloy (catalyst amount: 2.0 mg/cm$^2$) as the cathode catalyst.

As is apparent from FIG. 19, each of the fuel cells having a catalyst amount in the cathodes of 1.0 mg/cm$^2$ or more (samples 2 to 4) causes a small output decrease to the load current and thus has excellent load current characteristics. Further, it is found that the fuel cell using the Pd—Pt alloy as the cathode catalyst (sample 5) causes little or no output decrease and thus has more excellent load current characteristics. As described above, Pd and Pd alloy are effective as the cathode catalyst.

It should be noted that the present invention is applicable to various kinds of fuel cells using a liquid fuel. The concrete structure of the fuel cell and the supply form of the fuel are not specifically limited, and the present invention is applicable to various forms such as a case where all the fuel supplied to the MEA is vapor of a liquid fuel, a case where all of the fuel is a liquid fuel, and a case where the fuel is vapor a liquid fuel and part thereof is supplied in a liquid form. When carried out, the present invention can be embodied by modifying the components without departing from the technical scope of the present invention. Moreover, various modifications can be made such as appropriate combination of the plural components shown in the above-described embodiments, deletion of some components from all the components shown in the embodiments.

INDUSTRIAL APPLICABILITY

The fuel cell according to embodiments of the present invention can efficiently release gas components such as carbon gas, water vapor and the like generated on the side of fuel electrodes of a membrane electrode assembly accompanying electric generation reaction from gas vent holes provided in the membrane electrode assembly to the outside of the system. Therefore, the fuel cells according to the embodiments of the present invention are excellent in efficiency and stability over time of electric generation reaction, and thus can be effectively used as power sources of various apparatuses and devices.

What is claimed is:

1. A fuel cell, comprising:
an electromotive unit including a membrane electrode assembly having a fuel electrode, an air electrode, and an electrolyte membrane sandwiched between the fuel electrode and the air electrode;
a fuel storage unit storing a liquid fuel;
a fuel supply mechanism supplying the fuel from the fuel storage unit to the fuel electrode, the fuel supply mechanism including a fuel distribution plate having a fuel injection port connected to the fuel storage unit via a flow path so that the liquid fuel flows in, and a plurality of fuel discharge ports connected to the fuel injection port via a fuel passage to supply the fuel while dispersing the fuel in a plane direction of the fuel electrode; and
a gas vent hole provided at the membrane electrode assembly to discharge a gas component generated on the side of the fuel electrode to a side of the air electrode,
wherein the gas vent hole has a through hole which penetrates through the fuel electrode, the electrolyte membrane, and the air electrode in the membrane electrode assembly, and
wherein the gas vent hole is provided at a position where the gas vent hole does not substantially overlap with the plurality of fuel discharge ports in plan view.

2. The fuel cell according to claim 1,
wherein the electromotive unit has a plurality of unit cells each composed of the fuel electrode and the air electrode disposed with the electrolyte membrane intervening therebetween, and the plurality of unit cells are separately arranged within a plane of the electrolyte membrane and electrically connected with each other.

3. The fuel cell according to claim 2,
wherein the gas vent hole is provided at each of the plurality of unit cells in a manner to penetrate through the fuel electrode, the electrolyte membrane, and the air electrode.

4. The fuel cell according to claim 3,
wherein the gas vent hole has a first hole portion which penetrates through the fuel electrode, a second hole portion which penetrates through the electrolyte membrane, and a third hole portion which penetrates through the air electrode, and
wherein a first diameter of the first hole portion and a third diameter of the third hole portion are equal to or larger than a second diameter of the second hole portion.

5. The fuel cell according to claim 1,
wherein the fuel supply mechanism includes a fuel supply pump provided along the flow path.

6. The fuel cell according to claim 1,
wherein the gas vent hole has a pore diameter maintaining part maintaining a pore diameter thereof by securing an inner wall surface thereof.

7. The fuel cell according to claim 1,
wherein a filter containing a catalyst material is disposed at least one of in the gas vent hole or above the gas vent hole.

8. The fuel cell according to claim 1, further comprising:
a moisture retention layer stacked on the air electrode of the membrane electrode assembly, the moisture retention layer having a through hole or a thin portion provided at a position corresponding to the gas vent hole.

9. The fuel cell according to claim 1,
wherein the liquid fuel is a methanol aqueous solution having a methanol concentration of 80% or higher or pure methanol.

10. A fuel cell, comprising:
an electromotive unit including a membrane electrode assembly having a fuel electrode, an air electrode, and an electrolyte membrane sandwiched between the fuel electrode and the air electrode;
a fuel storage unit storing a liquid fuel;
a fuel supply mechanism supplying the fuel from the fuel storage unit to the fuel electrode, the fuel supply mechanism including a fuel distribution plate having a fuel injection port connected to the fuel storage unit via a flow path so that the liquid fuel flows in, and a plurality of fuel discharge ports connected to the fuel injection port via a fuel passage to supply the fuel while dispersing the fuel in a plane direction of the fuel electrode; and
a gas vent hole provided at the membrane electrode assembly to discharge a gas component generated on a side of the fuel electrode to a side of the air electrode,
wherein the electromotive unit has a plurality of unit cells each composed of the fuel electrode and the air electrode disposed with the electrolyte membrane intervening therebetween, and the plurality of unit cells are separately arranged within a plane of the electrolyte membrane and electrically connected with each other, and
wherein the gas vent hole is provided as a through hole which penetrates through the electrolyte membrane in a space between the plurality of unit cells and at a predetermined location where the gas vent hole does not substantially overlap with the plurality of fuel discharge ports in plan view.

11. The fuel cell according to claim 10,
wherein the fuel supply mechanism includes a fuel supply pump provided along the flow path.

12. The fuel cell according to claim 10,
wherein the liquid fuel is a methanol aqueous solution having a methanol concentration of 80% or higher or pure methanol.

* * * * *